UNITED STATES PATENT OFFICE.

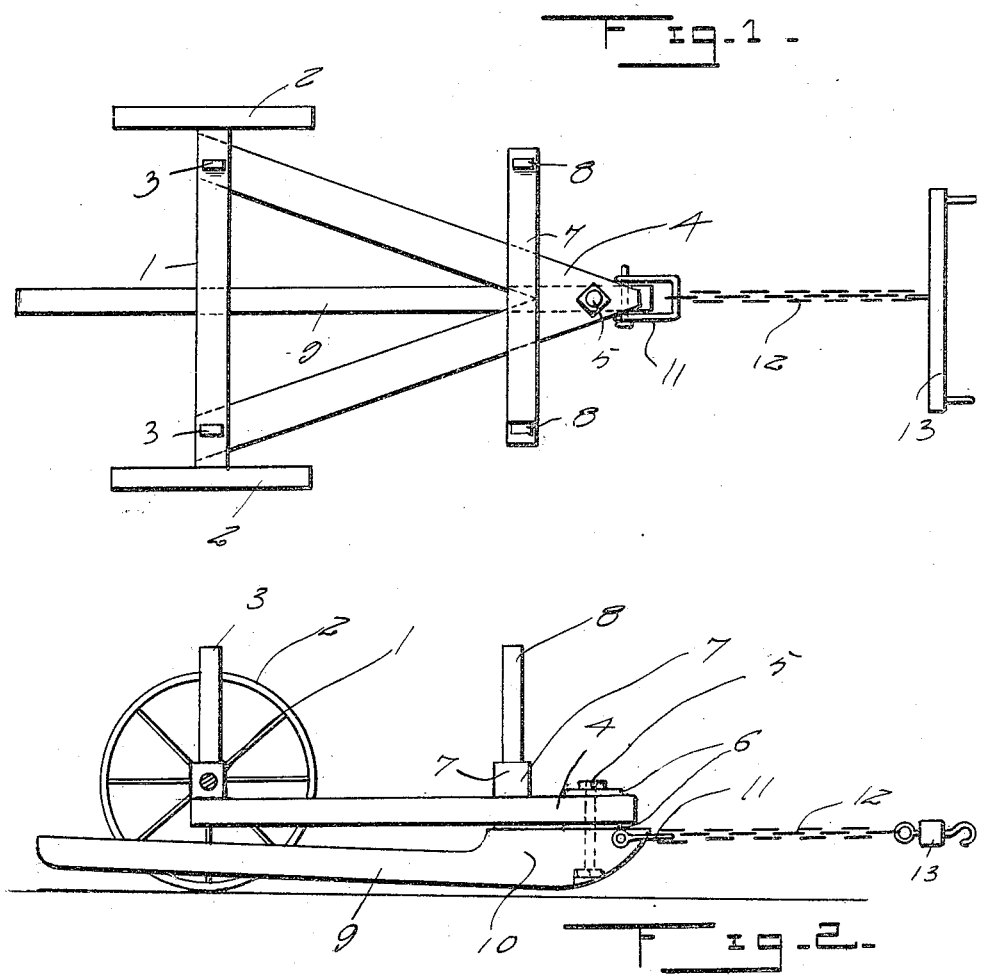

WRIGHT STANFIELD, OF APISON, TENNESSEE, ASSIGNOR OF ONE-FOURTH TO JESSE J. DAVIS, OF APISON, TENNESSEE.

TRUCK.

1,259,154.   Specification of Letters Patent.   Patented Mar. 12, 1918.

Application filed June 15, 1917. Serial No. 174,976.

*To all whom it may concern:*

Be it known that I, WRIGHT STANFIELD, a citizen of the United States, residing at Apison, in the county of James and State of Tennessee, have invented certain new and useful Improvements in Trucks; and I do hereby declare the following to be a full, clear, and exact description of the invention, such as will enable others skilled in the art to which it appertains to make and use the same.

This invention relates to improvements in a truck and has for one of its objects the provision of a device of this character, having means thereon which will automatically act as a brake or stop when the draft upon the truck is eliminated.

Another object of this invention is to provide a runner pivoted to the hounds of the truck and adapted to act as a brake or stop when the draft is released therefrom and which will prevent the truck from tipping when passing over steep grades.

A further object of this invention is the provision of a truck of the above stated character, which will be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:

Figure 1 is a plan view of a truck constructed in accordance with my invention,

Fig. 2 is a side elevation of the same.

Referring in detail to the drawing, the numeral 1 indicates an axle on which are journaled the usual ground wheels 2. The axle 1 has secured thereto, the uprights 3, which coöperate with the axle in forming the rear bolster. A V-shaped hound 4 has the ends of its arm portions secured to the under face of the axle 1 and its apex thereof apertured to receive a king bolt 5. Bearing plates 6 are secured upon each face of the apex of the hound 4 to prevent wear thereon. A front bolster 7 is secured to the hound 4 adjacent the apex thereof and has secured to each end, the vertical uprights 8, which uprights coöperate with the uprights 3 in supporting a load upon the bolster.

A runner 9 has an enlarged head 10 formed upon one end which is apertured to receive the king bolt 5 for pivotally connecting the runner 9 to the apex of the hound 4. A draft coupling 11 is pivoted to the head 10 and has connected thereto, a draft chain 12, to which a swingletree 13 or the like is connected for hitching draft power to the device.

When draft is applied to the runner 9, the runner is elevated from engagement with the ground, as clearly shown in Fig. 1 in full lines, thus placing the entire load on the wheels 2 and when the draft is slackened or released upon the runner 9, the same engages the ground and acts as a brake and the rear end of the runner prevents the device from tipping over when passing over uneven ground.

While I have shown and described the preferred embodiment of my invention, it will be understood that minor changes in construction, combination and arrangement of parts may be made without departing from the spirit and scope of the invention as claimed.

Having thus described my invention, what I claim is:

1. A truck comprising an axle, wheels journaled to said axle, a hound secured to the axle, a bolster carried by said hound, and means pivoted to the hound for forming an automatic stop or brake to the device when draft is released therefrom.

2. A truck comprising an axle, wheels journaled to said axle, a V-shaped hound secured to said axle, a bolster secured to said hound, and a runner pivoted to the apex of the hound and disposed rearwardly between the wheels and adapted to act as an automatic brake or stop to the device when the draft is released therefrom.

3. A truck comprising an axle, wheels journaled to said axle, and hounds secured to said axle, bolsters secured to said hounds, a runner having an enlarged head pivoted to the hounds, and draft means connected to the head for the purpose of causing the rear end of the runner to disengage from the ground, and which runner will engage the ground throughout its length when the draft is released from said runner to act as a stop or brake.

In testimony whereof I affix my signature in presence of two witnesses.

WRIGHT STANFIELD.

Witnesses:
J. J. Davis,
A. W. Marshall.